United States Patent [19]

Sato

[11] 4,426,738
[45] Jan. 17, 1984

[54] DICTATING MACHINE
[75] Inventor: Masanobu Sato, Hachioji, Japan
[73] Assignee: Olympus Optical Company Limited, Tokyo, Japan
[21] Appl. No.: 229,273
[22] Filed: Jan. 28, 1981
[30]   Foreign Application Priority Data Jan. 30, 1980 [JP]   Japan .............................. 55-11078[U]

[51] Int. Cl.³ ............................................ H04B 9/00
[52] U.S. Cl. ...................................... 455/603; 369/24; 369/25
[58] Field of Search .................... 455/103; 369/24, 25, 369/26, 29; 360/69

[56]           References Cited
U.S. PATENT DOCUMENTS 3,325,593  6/1967  Platt et al. ........................... 455/603

3,549,821 12/1970 Langendorf et al. ................ 369/24
3,911,482 10/1975 Kolb et al. ............................ 369/25

OTHER PUBLICATIONS

Dance-Multichannel Remote Control Systems-Electronics (GB) #153, Nov. 7, 1978, pp. 33, 34, 37.

*Primary Examiner*—Joseph A. Orsino, Jr.
*Attorney, Agent, or Firm*—Toren, McGeady and Stanger

[57]           ABSTRACT

A dictating machine which employs a wireless remote control system is disclosed. The machine includes a dictating machine body, a foot control switch, a remote control transmitter provided with the switch for generating a remote control signal in response to the foot switch operation, and a remote control receiver provided in the machine body for receiving remote control signal.

2 Claims, 6 Drawing Figures

4,426,738

DICTATING MACHINE

BACKGROUND OF THE INVENTION

The present invention relates to a dictating machine which incorporates a wireless remote control system.

Dictating machines in the field of office machines include a machine body combined with a foot control switch. That is, such a dictating machine often uses a wire system in connecting the machine body to the foot control switch by a flexible cord.

In the dictating machine with such a wire system, however, the cord leading from the machine body is connected to the foot control switch in the region of the operator's foot, so that there are inconvenient drawbacks in handling such as the engaging of the cord by the foot which in turn pulls the machine body. Therefore, the machine falls sometimes to the floor resulting in breakage.

SUMMARY OF THE INVENTION

An object of the present invention is to eliminate the above described disadvantage of the conventional dictating machine.

Another object of the present invention is to provide an extremely advantageous dictating machine in respect of handling by employing a wireless remote control system.

According to the present invention there is provided a dictating machine comprising a dictating machine body, foot control switch means including a foot switch, a remote control transmitter provided with the switch means for generating a remote control signal in response to a foot switch operation, and a remote control receiver provided in the machine body for receiving the remote control signal.

The dictating machine body is provided with a projectable arm, and the arm is provided with at least a receiving element of the remote control receiver section. The dictating machine body is coupled with the remote control receiver section through a cord, and the separate receiver section is arranged opposite to the transmitter section of the switch means. The remote control transmitter and receiver sections use an infrared ray as a remote control signal.

DESCRIPTION OF THE PREFERRED EMBODIMENT

Figure 1:
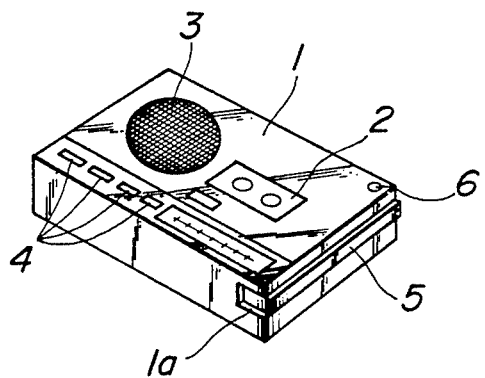
FIGS. 1 and 2 are perspective views showing one embodiment of a dictating machine according to the present invention, respectively.

Referring now to the drawings, wherein the same reference characters designate the same or corresponding parts in the several views, one embodiment of a dictating machine according to the present invention will be explained.

Figure 3:
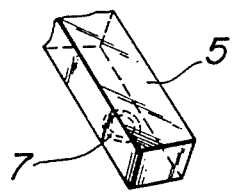
FIG. 3 is an enlarged perspective view showing a part of an arm used in the dictating machine shown in FIG. 1.

In FIG. 1, a dictating machine body 1 is placed on a desk (not shown) or the like for use. The machine body 1 is provided with a cassette loading chamber 2, a speaker 3 and a group of operation buttons 4 used for operating the machine body 1. This machine body 1 is also provided with an arm 5 on the side surface thereof. The arm 5 is rotatably mounted on a pivot shaft 6 extending in a recess 1a formed on the side surface of the machine body 1, and the arm 5 is projected by pulling it out from the recess 1a by a rotation operation according to demand. The machine body 1 is moreover, provided with a remote control receiver section 15, which will be described later on, and an element 7 for receiving a remote control signal, at the lower end of the arm 5 as shown in FIG. 3.

Figure 2:
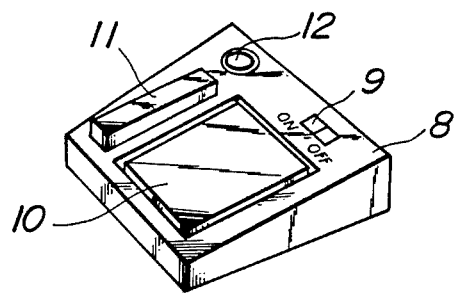

FIG. 2 shows foot control switch means 8 placed on the floor (not shown) or the like for use. The switch means 8 is provided with an electric power supply switch 9, a stepping play foot switch, such as a pedal switch 10, and a foot switch for rewinding by stepping on and stopping by stepping off, such as a pedal switch 11. In addition, the switch means 8 is provided with a remote control transmitter section 13, which will be described later on, and an element 12 for transmitting a remote control signal.

Figure 4:
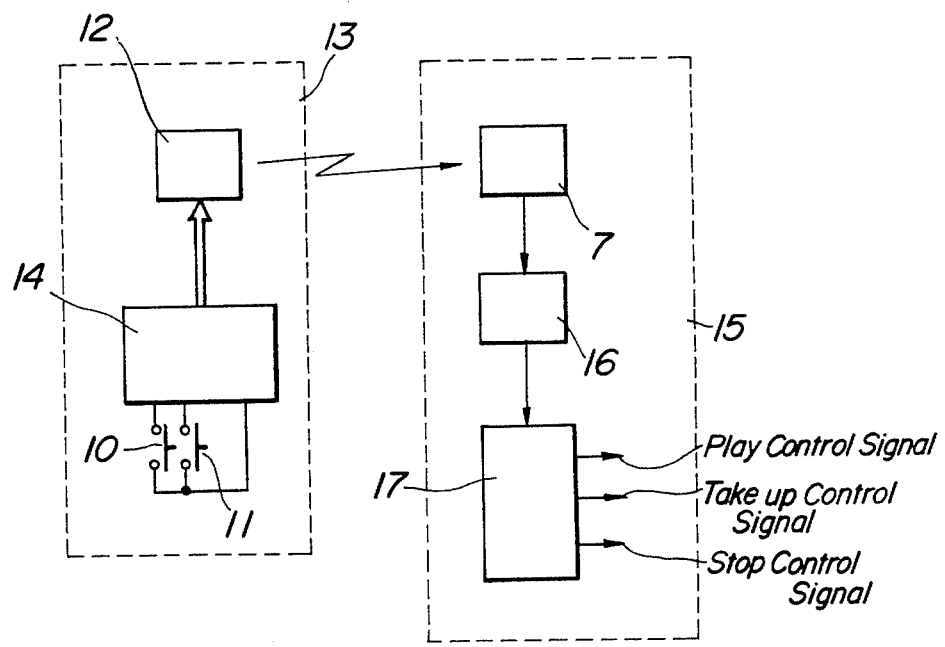
FIG. 4 is a block diagram showing the remote control transmitter and receiver sections used in the dictating machine shown in FIGS. 1 and 2.

In this case, the remote control receiver section 15 of the machine body 1 and the remote control transmitter section 13 of the switch means 8 are constructed as shown in FIG. 4 as an example. In FIG. 4, the remote control transmitter section 13 on the side of the switch means 8 generates a remote control signal from a signal generator portion 14 in accordance with an operation of the pedal switches 10, 11 as an infrared ray signal from the transmitter element 12, for example, such as a light emitting diode. On the other hand, the remote control receiver section 15 on the side of the machine body 1 receives the infrared ray signal at the reception element 7, for example, such as a photodiode. The element 7 generates an electric output signal and supplies it to a remote control signal discriminator portion 17 through an amplifier 16. The discriminator portion 17 generates a play control signal, rewinding or take up control signal and stop control signal in accordance with the operation of the pedal switches 10, 11.

Figure 5:
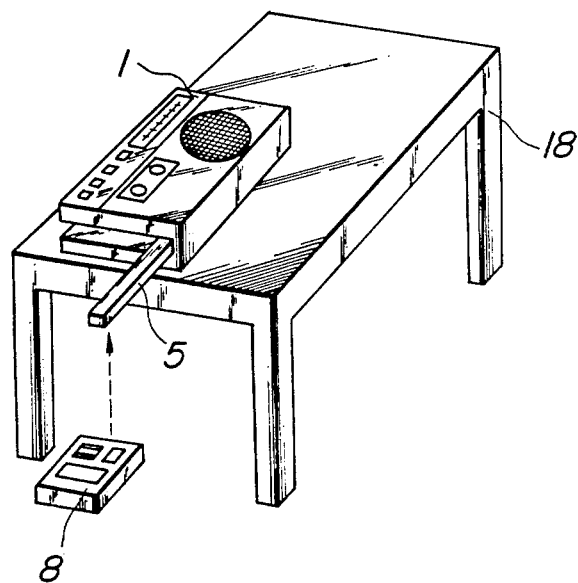
FIG. 5 is a perspective view explaining the operation of the machine according to the present invention.

An operation of the machine constructed as described above will be explained as follows. That is, the machine body 1 is placed on a desk 18 as shown in FIG. 5. In this case, the arm 5 is pulled out and sufficiently projected from the end of the desk 18 so as to positively receive a remote control signal from the transmitter section 13 within the switch means 8.

On the other hand, the foot control switch means 8 is placed beneath the desk 18, i.e., near the foot. In this case, if the reception element 7 of the remote control receiver section 15 at the machine body 1 is positioned at an angle within the range of about 45° with respect to the transmitter element 12 of the remote control transmitter section 13 in the switch means 8, the remote control transmitter and receiver sections can fully be operated.

Under such a state, if the pedal switch 10 is stepped on for operation, a remote control signal is generated from the signal generator portion 14 in response to the operation, so that an infrared ray signal is generated from the transmitter element 12. On the other hand, at the remote control receiver section 15 at the machine body 1, the infrared ray signal is received by the reception element 7, while an electric output signal is generated, thereby generating a play control signal from the remote control signal discriminator portion 17 in response to the operation of the pedal switch 10 and operating the machine body 1 in a play mode.

In the same manner, if the pedal switch 11 is stepped on and operated, a rewinding or take up control signal is generated from the remote control signal discriminator portion 17 so that the machine body 1 is operated in a rewinding mode, while if the pedal switch 11 is stepped off, a stop control signal is generated from the remote control signal discriminator portion 17 so that the machine body 1 is operated in a stop mode.

According to the above construction, therefore, each operation such as play, rewinding, stop or the like at the foot control switch means can be transmitted to the machine body by a wireless system. As a result, when compared with a conventional wire system which connects a foot control switch means to a machine body with a cord, the dictating machine according to the present invention eliminates such disadvantage wherein the cord is snagged and the machine body is dropped on the floor and broken, and the machine is very advantageously handled without any trouble. Moreover, since the dictating machine according to the present invention employs a wireless system, the machine body is just put on the desk and the switch region is just placed at the portion near the foot. Thus, the dictating machine according to the present invention is easy in handling when viewed from this point in comparison with the conventional one which is connected by the cord.

Figure 6:
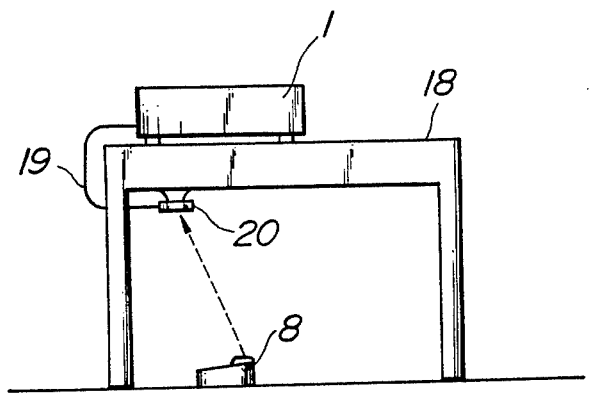
FIG. 6 is an elevational view showing another embodiment of the dictating machine according to the present invention.

In addition, the present invention is not limited to the above embodiment but can be modified without departing from the scope of the invention. For example, in the above embodiment, an infrared ray is used as a remote control signal, but any other means such as ultrasonic waves or the like can be used. Moreover, in the above embodiment, the arm 5 is provided on the side of the machine body and a remote control signal is positively received from beneath a desk, but as shown in FIG. 6, a remote control receiver section 20 is separately connected to the machine body 1 through a cord 19, and the receiver section 20 is fixed to the lower portion of the desk 18 with the use of a suction cup or the like.

As described above, according to the present invention, it is possible to provide an extremely advantageous dictating machine in regard to handling by employing a wireless remote control system.

What is claimed is:

1. In a dictating machine including a dictating machine body and foot control switch means including a foot switch, the improvement comprising a remote control transmitter section provided in the switch means for generating a wireless remote control signal over a certain range in response to a foot switch operation, and a remote control receiver section including a receiving element associated with the machine body for receiving the wireless remote control signal wherein said foot control switch means is unconnected to said dictating machine body and said foot control switch means controls operation of said dictating machine body when said remote control receiver section is within the range of the wireless remote control signal generated by said remote control transmitter section, and wherein the dictating machine body includes a pivotable arm for containing said receiving element of the remote control receiver section, said arm being arranged to pivot so that said receiving element can be extended over the edge of a support surface on which said machine body is placed.

2. A dictating machine as claimed in claim 1, wherein said remote control transmitter section and said remote control receiver section are arranged to use an infrared ray as said wireless remote control signal.

* * * * *